(12) United States Patent
van Nieuwstadt et al.

(10) Patent No.: US 6,397,587 B1
(45) Date of Patent: Jun. 4, 2002

(54) SYSTEM AND METHOD FOR MONITORING THE LOADING OF A DIESEL PARTICULATE FILTER

(75) Inventors: Michiel Jacques van Nieuwstadt, Ann Arbor; Ilya Vladimir Kolmanovsky, Ypsilanti, both of MI (US)

(73) Assignee: Frod Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/648,959

(22) Filed: Aug. 25, 2000

(51) Int. Cl.$^7$ .................................................. F01N 3/00
(52) U.S. Cl. ........................... 60/297; 60/274; 60/277; 60/278; 60/280; 60/311
(58) Field of Search .......................... 60/274, 277, 278, 60/280, 285, 286, 311, 602, 605.1; 55/DIG. 30; 73/38

(56) References Cited

U.S. PATENT DOCUMENTS

| | | | | |
|---|---|---|---|---|
| 4,176,641 A | * | 12/1979 | Perr | .......................... 60/605.1 |
| 4,434,761 A | * | 3/1984 | Ludwig | ...................... 60/605.1 |
| 4,492,079 A | | 1/1985 | Takagi et al. | |
| 4,747,264 A | * | 5/1988 | Santiago et al. | ............... 60/274 |
| 4,831,821 A | * | 5/1989 | Takeshima | ................... 60/286 |
| 4,835,963 A | | 6/1989 | Hardy | |
| 4,884,398 A | * | 12/1989 | Morita et al. | .................. 60/274 |
| 4,986,069 A | | 1/1991 | Barris et al. | |
| 5,050,376 A | * | 9/1991 | Stiglic et al. | .................. 60/274 |
| 5,063,736 A | | 11/1991 | Hough et al. | |
| 5,195,318 A | * | 3/1993 | Shinzawa et al. | ............. 60/286 |
| 5,398,541 A | | 3/1995 | Hijikata et al. | |
| 5,585,553 A | | 12/1996 | Schricker | |
| 6,202,412 B1 | * | 3/2001 | Lange et al. | ................... 60/602 |

\* cited by examiner

*Primary Examiner*—Thomas Denion
*Assistant Examiner*—Tu M. Nguyen
(74) *Attorney, Agent, or Firm*—Ford Global Tech., Inc.

(57) ABSTRACT

A system 10 is provided for monitoring the loading of a diesel particulate filter 12. System 10 is adapted for use in combination with a vehicle including an internal combustion diesel engine 14 of the type having several substantially identical cylinders 16 which drivably rotate a crankshaft 17. Engine 14 includes an intake manifold 18 which selectively delivers air to cylinders 16, and an exhaust manifold 20 which selectively discharges exhaust gasses from cylinders 16. System 10 includes an engine control unit or controller 40 which is communicatively connected to a pressure sensor 42 that is operatively disposed in the intake manifold 18, and other vehicle operating conditions sensors 44. Controller 40 monitors the signals received from sensors 42 and 44, and based upon the received signals, estimates the loading of the DPF 12 and determines when the DPF 12 should be regenerated.

8 Claims, 4 Drawing Sheets

SYSTEM AND METHOD FOR MONITORING THE LOADING OF A DIESEL PARTICULATE FILTER

FIELD OF THE INVENTION

This invention relates to a system and a method for monitoring the loading of a diesel particulate filter, and more particularly, to a system and method for accurately monitoring the loading of a diesel particulate filter which does not require the use of pressure and temperature sensors within the vehicle's exhaust system.

BACKGROUND OF THE INVENTION

Diesel engines provide significant fuel economy advantages at the expense of higher levels of regulated emissions. One of these diesel-produced emissions that must be regulated and controlled is commonly referred to as particulate matter.

Typically, the emission of particulate matter is significantly reduced by use of a diesel particulate filter ("DPF"). These filters are typically and operatively disposed within a vehicle's exhaust system and are effective to catch and store particulate matter before it is released into the atmosphere. A vehicle's DPF must be periodically regenerated as it becomes filled in order to dispose of the stored particulate matter. This regeneration is typically achieved by raising the temperature of the DPF to a predetermined level, and ensuring that the exhaust gas entering the DPF is of a certain composition.

Since the DPF is operatively placed within the exhaust system, the DPF increases the flow resistance and back pressure in the exhaust system as it becomes filled. In order to measure DPF loading and determine when a DPF should be regenerated, conventional systems monitor the pressure across the DPF (e.g., by the use of one or more pressure sensors disposed in the exhaust system) and the temperature of the DPF. These conventional systems combine these pressure and temperature measurements with engine operating data to arrive at a metric representative of DPF loading. The engine control unit monitors the appropriate signals and computes the loading metric continuously. Once the metric exceeds a predetermined calibratable threshold, the engine control unit switches to a regeneration strategy. While these systems are effective to accurately monitor DPF loading, the pressure and temperature sensors required to obtain the DPF loading measurements are relatively expensive and undesirably increase the overall cost of the vehicle.

There is therefore a need for a new and improved system and method for monitoring DPF loading which accurately determines when a DPF should be regenerated without the use of pressure and/or temperature sensors in the exhaust system.

SUMMARY OF THE INVENTION

It is a first object of the invention to provide a system and method for monitoring the loading of a diesel particulate filter ("DPF") which overcomes at least some of the previously delineated drawbacks of prior systems, assemblies and methodologies.

It is a second object of the invention to provide a system and method for monitoring the loading of a DPF which accurately determines when the DPF should be regenerated.

It is a third object of the invention to provide a system and method for monitoring the loading of a DPF which does not require the use of costly pressure and/or temperature sensors within the vehicle's exhaust system.

According to a first aspect of the present invention, a system is provided for monitoring loading of a diesel particulate filter which is operatively disposed within a vehicle of the type including an engine having an intake manifold and a turbocharger. The system includes at least one first sensor which is effective to measure at least one operating attribute of the engine and to generate a first signal representing the measured operating attribute; a second sensor which is operatively disposed within the intake manifold and which is effective to measure a boost pressure within the intake manifold and to generate a second signal representing the measured pressure; and a controller which is communicatively coupled to the first and second sensors, and which receives the first and second signals, the controller being effective to compare the received second signal to a nominal pressure value which is selected based upon the first signal, and to determine the loading of the diesel particulate filter based upon the comparison.

According to a second aspect of the present invention, a method is provided for monitoring loading of a diesel particulate filter which is operatively disposed within a vehicle of the type including an engine having a variable geometry turbine which maintains boost pressure in a closed-loop fashion. The method includes the steps of measuring at least one operating attribute of the engine; measuring a control effort of the variable geometry turbine; determining a nominal control effort for the variable geometry turbine based upon the measured at least one operating attribute; and comparing the measured control effort to the nominal control effort, effective to determine whether the diesel particulate filter is substantially filled.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
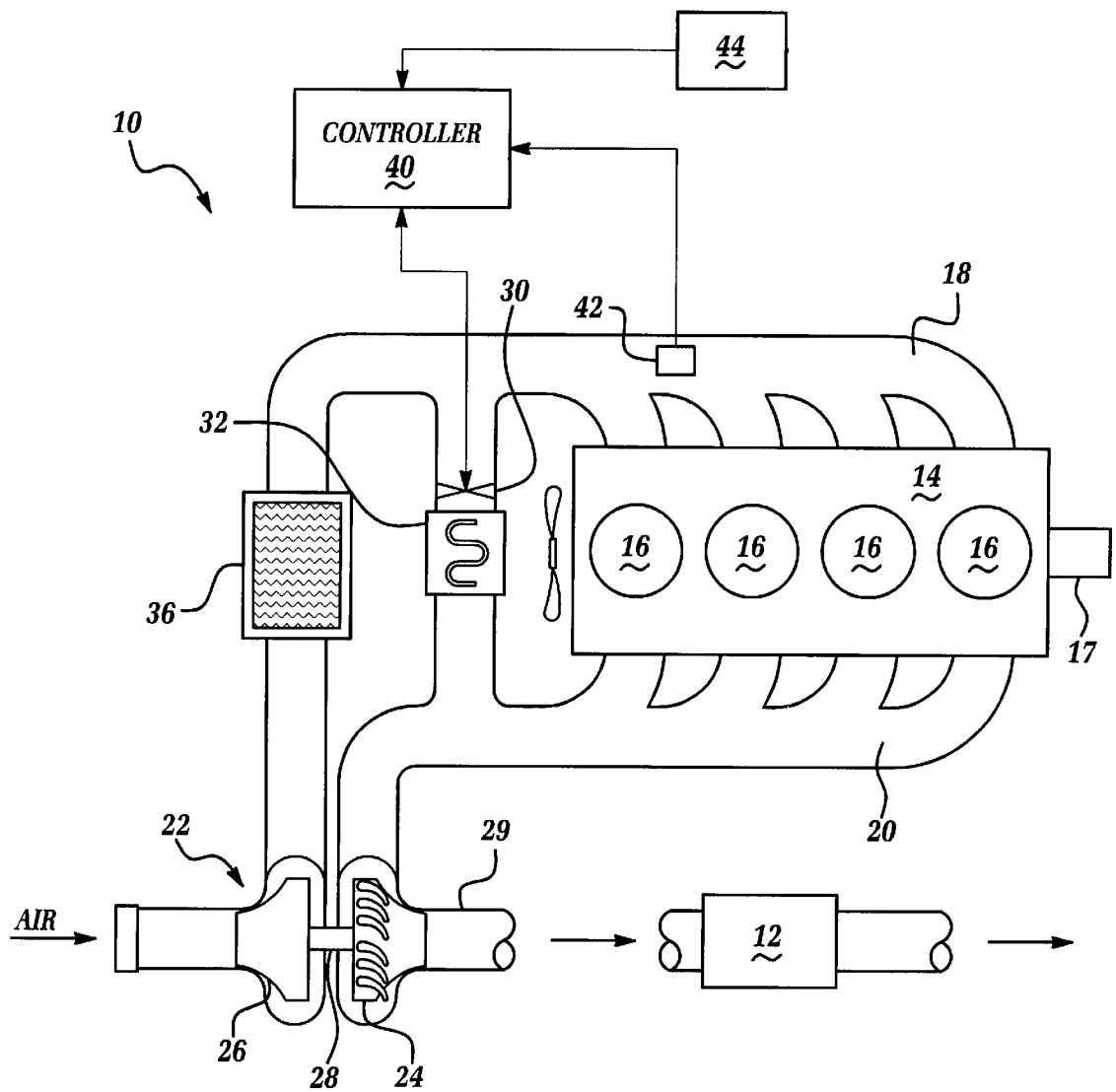
FIG. 1 is a schematic view of a system for monitoring the loading of a diesel particulate filter ("DPF"), which is made in accordance with the teachings of a first embodiment of the invention and which is implemented within an engine including a turbocharger having a fixed geometry turbine.

Referring now to FIG. 1, there is shown a system 10 for monitoring the loading of a diesel particulate filter ("DPF") 12 which is made in accordance with the teachings of a first embodiment of the invention. System 10 is adapted for use in combination with a vehicle including an internal combustion diesel engine 14 of the type having several substantially identical cylinders 16 which drivably rotate a crankshaft 17. Engine 14 includes an intake manifold 18 which selectively delivers air to cylinders 16, and an exhaust manifold 20 which selectively discharges exhaust gasses from cylinders 16. Engine 14 further includes a turbocharger 22 having a fixed geometry turbine 24 and a compressor 26 which are operatively and rotatably mounted on a common shaft 28. Turbine 24 utilizes the energy contained in the exhaust gas to drive compressor 26, which in turn draws outside air into the system, pre-compresses it and supplies it to cylinders 16 through intake manifold 18. The exhaust gases are channeled through an exhaust conduit 29 that carries the gas through the DPF 12, thereby removing particulate matter from the exhaust gasses prior to discharging the exhaust gasses into the atmosphere. Engine 14 further includes an exhaust gas recirculation ("EGR") valve 30, an EGR cooling assembly or "cooler" 32, and an intercooling assembly or "intercooler" 36.

In the preferred embodiment, system 10 includes an engine control unit or controller 40 which is communicatively connected to EGR valve 30, a boost pressure sensor 42 that is operatively disposed in the intake manifold 18, and other vehicle operating conditions sensors 44. As discussed more fully and completely below, controller 40 monitors the signals received from sensors 42 and 44, and based upon the received signals, estimates the loading of the DPF 12 and determines when the DPF 12 should be regenerated.

In the preferred embodiment, controller 40 is a conventional controller including one or more microprocessors which cooperatively perform the below-described processes. In one embodiment, controller 40 comprises a portion of a conventional engine control unit ("ECU"). In other alternate embodiments, controller 40 is externally coupled to the vehicle's engine control unit. Controller 40 includes one or more database tables or matrixes which selectively store "boost" or manifold pressure ("MAP") values for various ranges of engine operating speeds and loads which controller 40 uses to estimate the loading of DPF 12.

Sensor 42 comprises a conventional and commercially available conventional manifold or boost pressure ("MAPF") sensor which measures the manifold pressure within intake manifold 18 and generates and communicates signals to controller 40 (and/or to an engine control unit) representing the measured pressure. Sensors 44 comprise conventional and commercially available engine operating condition sensors, which may include without limitation one or more conventional sensors which measure particular engine operating attributes and which generate a signal representing these attributes.

In the preferred embodiment, sensors 44 include engine speed or "RPM" sensors which measure engine speeds and respectively generate and communicate signals to controller 40 (and/or to an engine control unit) representing the measured speeds. Sensors 44 further include one or more engine load sensors which measure or estimate engine loads (e.g., by monitoring fuel flow within the engine) and respectively generate and communicate signals to controller 40 (and/or to an engine control unit) representing the measured engine loads. Based on the data received from sensors 42, 44, controller 40 estimates the loading of the DPF 12 and determines whether to implement a regeneration strategy.

Figure 2:
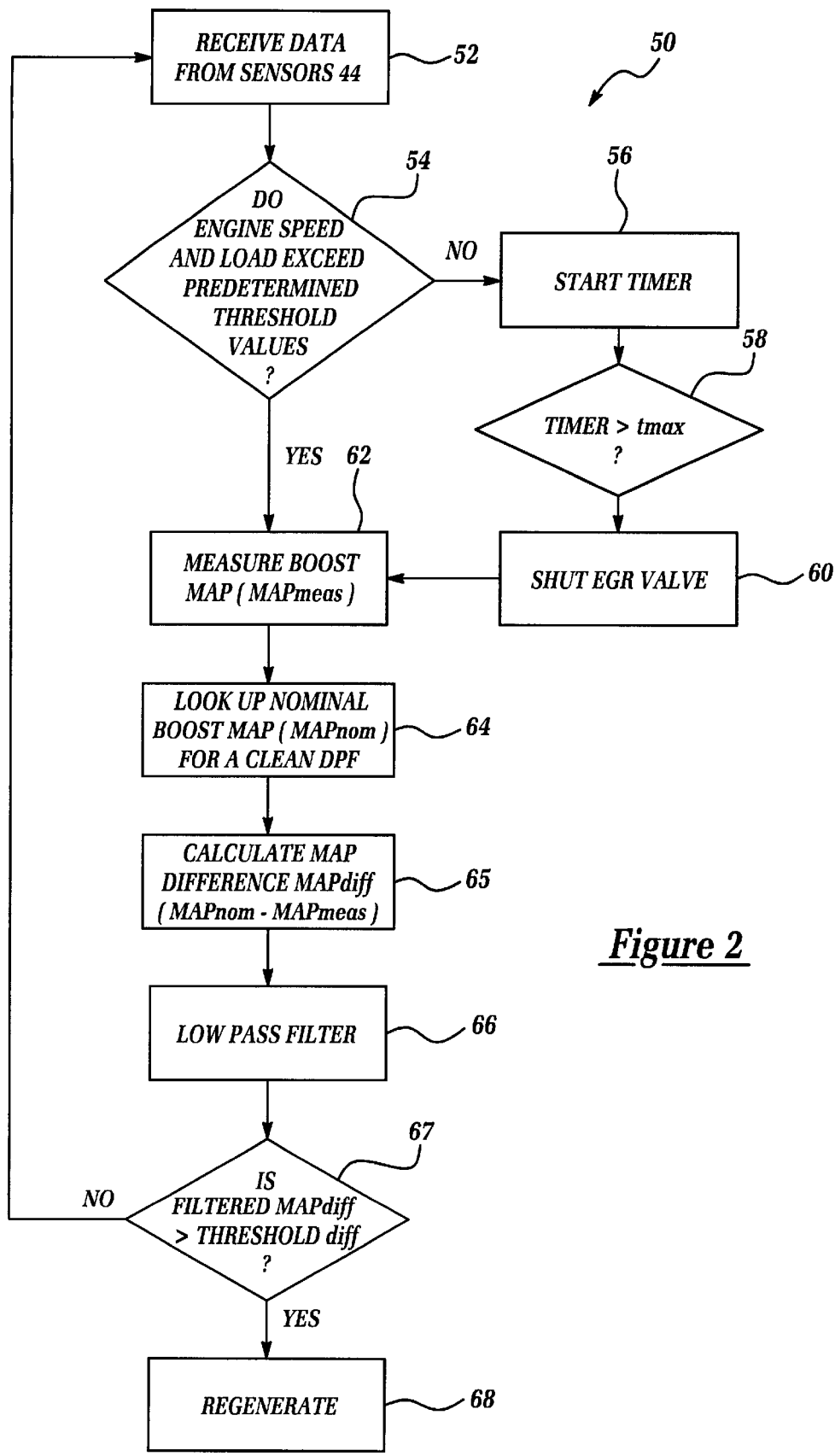
FIG. 2 is a block diagram illustrating a method used by the system shown in FIG. 1 to monitor DPF loading and to determine when the DPF should be regenerated.

To understand the operation of system 10, reference is now made to "flow chart" or diagram 50 of FIG. 2, illustrating the strategy employed by system 10 to monitor loading of the DPF 12 and to determine when the DPF 12 should be regenerated. As shown, strategy 50 begins with functional block or step 52, where controller 40 receives data from sensors 44 representing the speed and load of engine 14. Controller 40 processes the data received from sensors 44 and uses conventional algorithms and/or equations to determine and/or estimate the engine speed and load. In functional block or step 54, controller 40 compares the calculated engine speed and load to predetermined minimum speed and load threshold values. In the preferred embodiment, if either the engine speed or engine load exceeds its respective minimum threshold value, controller 40 proceeds to functional block or step 62. In an alternate embodiment, both the engine speed and the engine load must exceed their respective minimum threshold values for controller 40 to proceed to step 62. Step 54 ensures that the estimation of DPF loading occurs only after the engine 14 has achieved minimum speed and/or load values which are required for accurately estimating the DPF loading.

If the measured engine speed and/or load do not exceed the minimum threshold values, controller 40 proceeds to step 56 and sets an internal or external timer. Controller 40 continues to monitor the engine speed and load while the timer is active, and if the engine speed and/or load at any time exceed the respective minimum threshold values, controller 40 proceeds directly to step 62. Otherwise, if a predetermined amount of time expires (e.g., $t_{max}$), as shown in functional block or step 58, controller 40 proceeds to functional block or step 60. In step 60, controller 40 sends a signal to EGR valve 30, effective to close EGR valve 30 for a predetermined period of time. The closure of EGR valve 30 is effective to create a more noticeable difference in the boost manifold pressure if the DPF is in a loaded state, thereby making the loading of the DPF more discernable.

In functional block or step 62, controller 40 uses sensor 42 to measure the boost or manifold pressure ("$MAP_{meas}$"). Controller 40 then proceeds to functional block or step 64, where it determines or selects a nominal value for the MAP under the current engine operating conditions (e.g., speed and load) the nominal value corresponding to a MAP value which would be "expected" if the DPF were substantially "clean" (e.g., free of particulate matter) The nominal or "expected" value ("$MAP_{nom}$") is determined by accessing a database or table within controller 40. The nominal MAP table or matrix includes a plurality of "expected" or nominal boost pressure values. Each of the "MAP" values corresponds to a particular engine speed value or range of values and a particular engine load value or range of values. The MAP values within the table are determined using conventional testing procedures. In the preferred embodiment of the invention, the current measured engine speed is used to index or "reference" a column in the nominal MAP table, and the current measured engine load is used to index or "reference" a row in the nominal MAP table.

Once controller 40 obtains or "looks up" the nominal MAP value corresponding to current engine speed and load, controller 40 proceeds to functional block or step 65, where it calculates the difference between the nominal MAP value and the measured MAP value (i.e., $MAP_{diff} = MAP_{nom} - MAP_{meas}$) . In functional block or step 66, controller 40 applies a conventional low pass filter to the MAP difference to remove transients. Controller 40 then determines whether the filtered MAP difference exceeds a predetermined calibratable minimum threshold difference (i.e., is $MAP_{diff}$>minimum threshold difference), which itself may be dependent on engine speed and/or load, as shown in functional block or step 67. If $MAP_{diff}$ does not exceed the minimum threshold difference, controller 40 determines that the DPF is sufficiently "clean", as a substantially "loaded" DPF will cause a significant decrease in the measured MAP. Controller 40 then returns to step 52 and repeats the foregoing strategy. Alternatively, if $MAP_{diff}$ exceeds the minimum threshold difference, controller 40 determines that the DPF is substantially "loaded" or filled with particulate matter and proceeds to functional block or step 68. In step 68, controller 40 performs a conventional DPF regeneration strategy (e.g., controller 40 increases the temperature of the DPF 12 to a predetermined level or value), thereby disposing of the stored particulate matter.

In this manner, the system 10 is able to selectively monitor DPF loading without the use of pressure and/or temperature sensors in the exhaust system 29 (e.g., "across" or on each side of the DPF 12). Furthermore, the present system 10 allows for accurate measurements of DPF loading using the existing hardware present within a typical vehicle and does not require the use of extraneous components.

Figure 3:
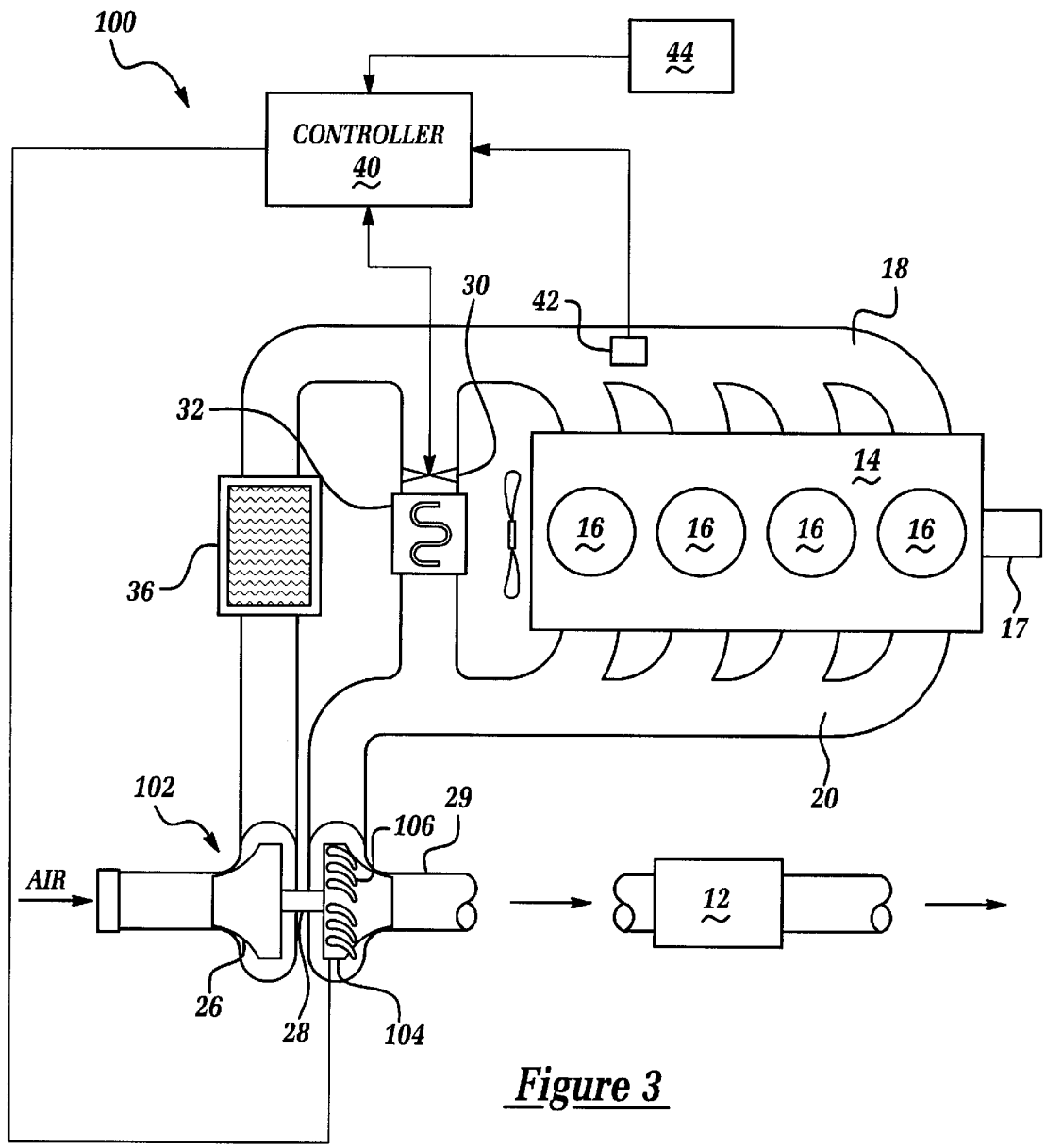
FIG. 3 is a schematic view of a system for monitoring the loading of a DPF which is made in accordance with the teachings of a second embodiment of the invention and which is implemented within an engine including a turbocharger having a variable geometry turbine.

Referring now to FIG. 3, there is shown a system 100 made in accordance with the teachings of a second embodiment of the present invention. System 100 is substantially identical to system 10 with the exception that turbocharger 22 has been replaced with a turbocharger 102 having a variable geometry turbine ("VGT") 104 which includes several vanes 106 which are selectively positionable in various angular positions, effective to produce different amounts of VGT effort or airflow capability. Controller 40 is communicatively coupled to VGT 104 and selectively communicates signals to a vane actuator which is operatively contained within the VGT 104 and which is effective to selectively adjust the angle or position of the vanes or blades 106 of the VGT 104, thereby altering the VGT effort and/or ability to communicate air through the system. Particularly, VGT 104 utilizes a conventional closed-loop strategy to maintain a certain set point or boost pressure within the system. For purposes of this discussion, "increasing" the VGT effort corresponds to a "closing" of the VGT vanes, thereby increasing the boost pressure within the system.

Figure 4:
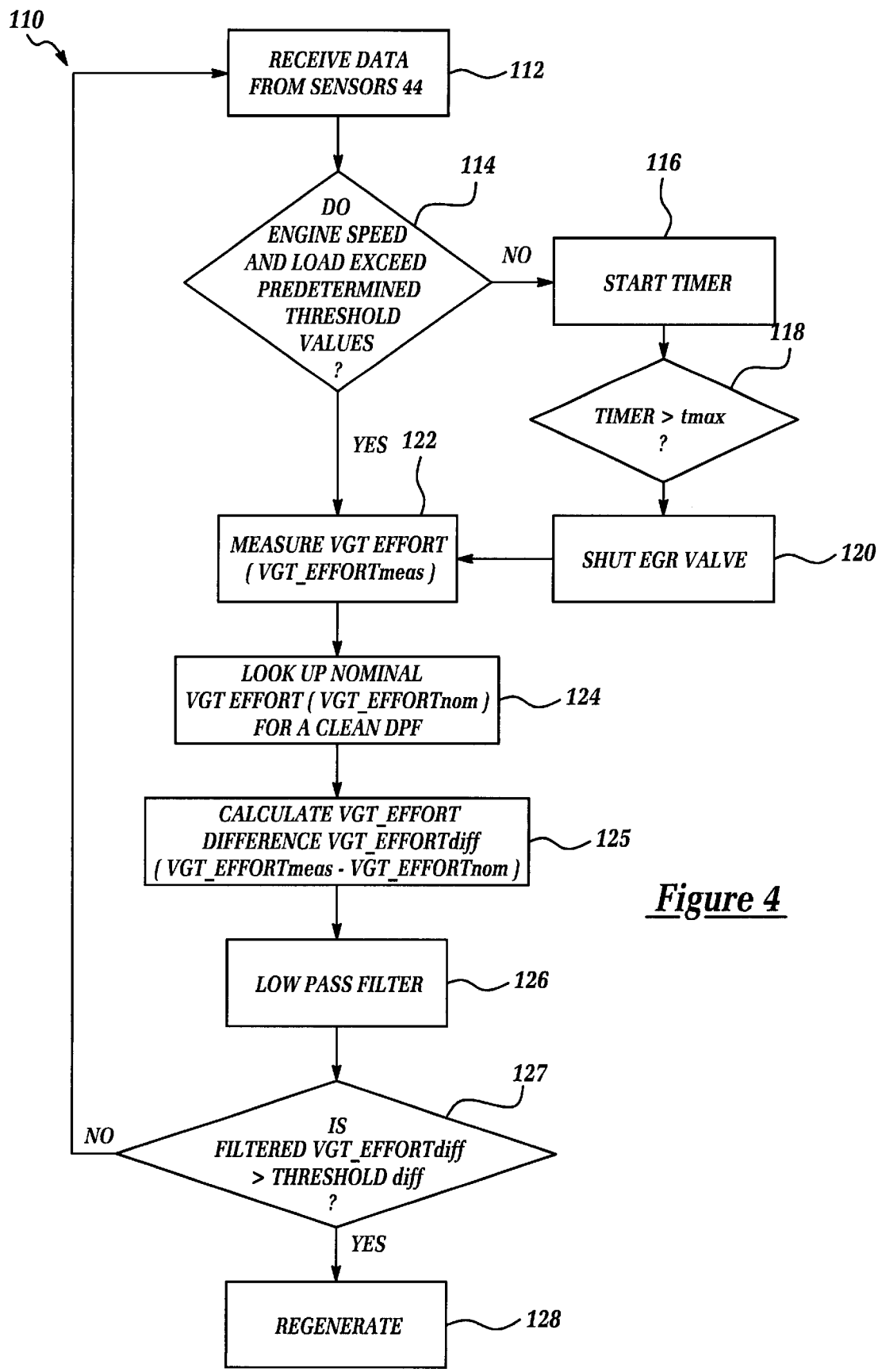
FIG. 4 is a block diagram illustrating a method used by the system shown in FIG. 3 to monitor DPF loading and to determine when the DPF should be regenerated.

To understand the operation of system 100, reference is now made to "flow chart" or diagram 110 of FIG. 4, illustrating the strategy employed by system 100 to monitor loading of the DPF 12 and to determine when the DPF 12 should be regenerated. As shown, strategy 110 begins with functional block or step 112, where controller 40 receives data from sensors 44 representing the speed and load of engine 14. Controller 40 processes the data received from sensors 44 and uses conventional algorithms and/or equations to determine and/or estimate the engine speed and load. In functional block or step 114, controller 40 compares the calculated engine speed and load to predetermined minimum speed and load threshold values. In the preferred embodiment, if either the engine speed or engine load exceeds its respective minimum threshold value, controller 40 proceeds to functional block or step 122. In an alternate embodiment, both the engine speed and the engine load must exceed their respective minimum threshold values for controller 40 to proceed to step 122. Step 114 ensures that the DPF loading measurements occur only after the engine has achieved minimum speed and/or load values that are required for the DPF loading measurements to be substantially accurate.

If the measured engine speed and/or load do not exceed the minimum threshold values, controller 40 proceeds to step 116 and starts an internal or external timer. Controller 40 continues to monitor the engine speed and load while the timer is active, and if the engine speed and/or load at any time exceed their respective minimum threshold values, controller 40 proceeds directly to step 122. Otherwise, if a predetermined amount of time expires (e.g., $t_{max}$), as shown in functional block or step 118, controller 40 proceeds to functional block or step 120. In step 120, controller 40 sends a signal to EGR valve 30 effective to close EGR valve 30 for a predetermined period of time. The closure of EGR valve 30 is effective to create a more noticeable difference in the VGT control if the DPF is in a loaded state, thereby making the loading of the DPF more discernable.

Once controller 40 indexes or "looks up" the nominal VGT effort value corresponding to current engine speed and load, controller 40 proceeds to functional block or step 125, where it calculates the difference between the measured VGT effort value and the nominal VGT effort value (i.e., $\text{VGT\_effort}_{diff} = \text{VGT\_effort}_{meas} - \text{VGT\_effort}_{nom}$). In functional block or step 126, controller 40 applies a conventional low pass filter to the VGT effort difference to remove transients. Controller 40 then determines whether the filtered VGT effort difference exceeds a predetermined calibratable minimum threshold difference (i.e., is $\text{VGT\_effort}_{diff} =$ >minimum threshold difference), which itself may be dependent on engine speed and/or load as shown in functional block or step 127. If $\text{VGT\_effort}_{diff}$ does not exceed the minimum threshold difference, controller 40 determines that the DPF is sufficiently "clean", as a substantially "loaded" DPF will cause a significant increase in the VGT effort required to maintain a certain set point. Controller 40 then returns to step 112 and repeats the foregoing strategy. Alternatively, if $\text{VGT\_effort}_{diff}$ exceeds the minimum threshold difference, controller 40 determines that the DPF is substantially "loaded" or filled with particulate matter and proceeds to functional block or step 128. In step 128, controller 40 performs a conventional DPF regeneration strategy (e.g., controller 40 increases the temperature of DPF 12), thereby disposing of the stored particulate matter.

In functional block or step 122, controller 40 determines the VGT control effort or the angular position of the vanes 106 of the VGT ("$\text{VGT\_effort}_{meas}$"). In the preferred embodiment, controller determines the effort by monitoring the control signal communicated to the VGT 104. Controller 40 then proceeds to, functional block or step 124, where it determines or selects a nominal value for the VGT effort under the current engine operating conditions (e.g., speed and load) - the nominal value corresponding to a value that would be "expected" if the DPF were substantially clean (e.g., free of particulate matter). The nominal or "expected" value ("$\text{VGT\_effort}_{nom}$") is determined by accessing a database or table within controller 40. The nominal VGT effort table or matrix includes a plurality of "expected" or nominal VGT effort values, which in one non-limiting embodiment correspond to the angular position of the VGT vanes 106. Each of the "VGT effort" values corresponds to a particular engine speed value or range of values and a particular engine load value or range of values. In the preferred embodiment of the invention, the current measured engine speed is used to index or "reference" a column in the nominal VGT effort table, and the current measured engine load is used to index or "reference" a row in the nominal VGT effort table.

Once controller 40 indexes or "looks up" the nominal VGT effort value corresponding to current engine speed and load, controller 40 proceeds to functional block or step 125, where it calculates the difference between the measured VGT effort value and the nominal VGT effort value (i.e., $\text{VGT\_effort}_{diff} = \text{VGT\_effort}_{meas} - \text{VGT\_effort}_{nom}$). In functional block or step 126, controller 40 applies a conventional low pass filter to the VGT effort difference to remove transients. Controller 40 then determines whether the filtered VGT effort difference exceeds a predetermined calibratable minimum threshold difference (i.e., is $\text{VGT\_effort}_{diff}$>minimum threshold difference), which itself may be dependent on engine speed and/or load. If VGT_effort$_{diff}$ does not exceed the minimum threshold difference, controller 40 determines that the DPF is sufficiently "clean", as a substantially "loaded" DPF will cause a significant increase in the VGT effort required to maintain a certain set point. Controller 40 then returns to step 112 and repeats the foregoing strategy. Alternatively, if VGT_effort$_{diff}$ exceeds the minimum threshold difference, controller 40 determines that the DPF is substantially "loaded" or filled with particulate matter and proceeds to functional block or step 128. In step 128, controller 40 performs a conventional DPF regeneration strategy (e.g., controller 40 increases the temperature of DPF 12), thereby disposing of the stored particulate matter.

In this manner, the system 100 is able to selectively monitor DPF loading without the use of pressure and/or temperature sensors in the exhaust system (e.g., "across" or on each side of the DPF 12). Furthermore, the present system 100 allows for accurate measurements of DPF loading using existing hardware present within a vehicle and does not require the use of extraneous components.

It is to be understood that the invention is not to be limited to the exact construction and/or method which has been illustrated and discussed above, but that various changes and/or modifications may be made without departing from the spirit and the scope of the invention.

What is claimed is:

1. A system for monitoring loading of a diesel particulate filter which is operatively disposed within a vehicle of the type including an engine having an intake manifold and a turbocharger, said system comprising:

at least one first sensor which is effective to measure at least one operating attribute of said engine and to generate a first signal representing said measured operating attribute;

a second sensor which is operatively disposed within said intake manifold and which is effective to measure a manifold pressure within said intake manifold and to generate a second signal representing said measured pressure; and a controller which is communicatively coupled to said first and second sensors, and which receives said first and second signals, said controller being effective to compare said received second signal to a nominal pressure value which is selected based upon said first signal, and to determine said loading of said diesel particulate filter based upon said comparison.

2. The system of claim 1 wherein said at least one first sensor comprises an engine speed sensor which measures an operating speed of said engine.

3. The system of claim 2 wherein said at least one first sensor further comprises a sensor for estimating an operating load of said engine.

4. The system of claim 3 wherein said controller is further effective to regenerate said diesel particulate filter when said controller determines that said filter is substantially filled with particulate matter.

5. The system of claim 4 wherein said controller further comprises a table including a plurality of nominal pressure values, said controller being effective to index said table based upon said measured engine speed and said measured engine load.

6. A method for determining when to regenerate a diesel particulate filter which is operatively disposed within a vehicle of the type including an engine having an intake manifold and a turbocharger, said method comprising the steps of:

measuring a speed of said engine;

measuring a load of said engine;

measuring a manifold pressure within said intake manifold;

selecting a nominal manifold pressure based upon said measured speed and said measured load;

calculating a difference between said nominal manifold pressure and said measured manifold pressure;

determining whether said difference exceeds a certain threshold value; and regenerating said diesel particulate filter if said difference exceeds said certain threshold value.

7. The method of claim 6 wherein said nominal manifold pressure is selected using a table which includes a plurality of nominal pressure values, said table being indexed using said measured engine speed and said measured engine load.

8. The method of claim 6 further comprising the step of:

applying a low pass filter to said difference prior to determining whether said difference exceeds said certain threshold value.

* * * * *